INVENTOR
Tom Wilson.
BY Geo. E. Thackray
ATTORNEY

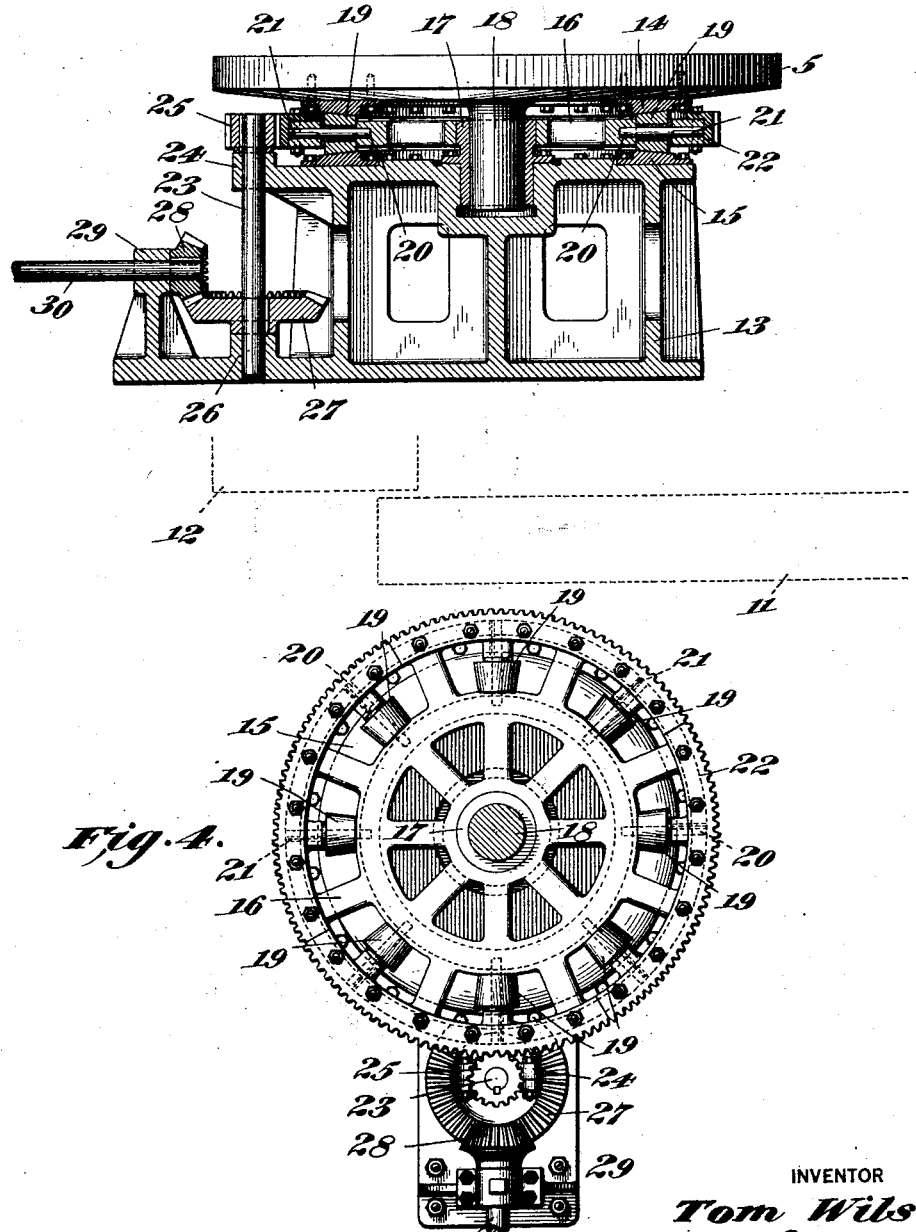

Patented June 23, 1925.

1,543,307

UNITED STATES PATENT OFFICE.

TOM WILSON, OF JOHNSTOWN, PENNSYLVANIA.

MILL APPLIANCE.

Application filed August 13, 1921. Serial No. 491,935.

*To all whom it may concern:*

Be it known that I, TOM WILSON, a citizen of the United States, and a resident of the city of Johnstown, county of Cambria, and State of Pennsylvania, have invented certain new and useful Improvements in Mill Appliances; and I do hereby declare the following to be a full, clear, and exact description of the invention, such as will enable others skilled in the art to which it appertains to make and use the same.

My invention relates to a mill appliance, which is particularly adapted for use in connection with rolling mills which roll steel or other blooms, billets or slabs, but for simplicity and ease of description herein, I will hereinafter refer to these as billets.

My apparatus is located preferably adjacent to a shears which cuts the long rolled billets into shorter pieces for further rolling into various rolled metal products, and is adapted to receive these shorter pieces as they are cut by the shears and to receive the crop ends of such billets or the imperfect pieces, and deliver the crop ends or imperfect pieces in one direction to a scrap car or otherwise for further disposal, and to receive the other and good billets and deliver them elsewhere for transportation to other finishing millings or to a yard for storage as may be desired.

One of the particular features of my invention is that I provide a turntable adjacent to the shear which turntable is of massive construction and well adapted to withstand the impact of heavy masses of steel or other metal which slide or fall upon it forcibly, and in this respect it is much better than the usual chain or flight conveyor, which latter by reason of its construction is not adapted to withstand such impacts. My turntable is so mounted and equipped as to be rotated and is provided with chutes, guides and gates through which the pieces are adapted to slide by gravity and the movement of the turntable the gates and guides are so arranged that the crop ends and imperfect pieces may be diverted in one direction for accumulation in a scrap car or otherwise, wherein they may be transported for remelting, while the gate, guides and chutes are also arranged so that the good billets may be delivered to a conveyor, which while carrying them away from the shears, also operate on an upward incline to transport said billets to a height sufficient to allow them to drop by gravity into convenient cars or on large piles for further use. It will be understood that these billets are delivered from the rolling mills in a red hot condition and are handled while still red hot by means of my apparatus.

The construction of my mill appliance is also such that the turntable, by reason of its comparatively large diameter, provides ample room for the necessary chutes and switch gates and with practicable or small angles of movement of the material in said chutes to permit the clear passage therethrough of pieces of any reasonable length, and this is a further improvement, as ordinary chain conveyors cannot be made of widths sufficient to allow this convenient arrangement of chutes and gates and the resultant ease of movement therethrough.

A further advantage of my turntable arrangement is that by reason of the solid construction of the turntable top, there are no openings therein which enable it to handle very short crop ends and very short billets, which could not be handled by rollers or by conveyor flights spaced apart, as such short pieces would drop between the rollers or flights and would not be conveyed.

By reason of the upwardly inclined arrangement of my crop end and billet conveyors, I am able to place the base of my turntable at a very slight distance below the general floor level, which, with other types of conveyors must be at a very considerable depth, approximately 15 ft. or thereabouts. When such prior constructions are used, such pits are in some cases impracticable as they are below water level besides which such deep pits or excavations are apt to accumulate dirt, scale and scrap and are expensive to keep clean and maintain, all of which is obviated by my construction.

Having thus given a general description of my apparatus, I will now, in order to make the matter more clear, refer to the annexed two sheets of drawings which form part of this specification and in which like characters refer to like parts.

Figure 3 is a central vertical sectional elevation of the turntable base and rotating mechanism, the turntable itself being in side elevation, and Figure 4 is a top plan view of the turntable bed and driving mechanism.

Figure 1:
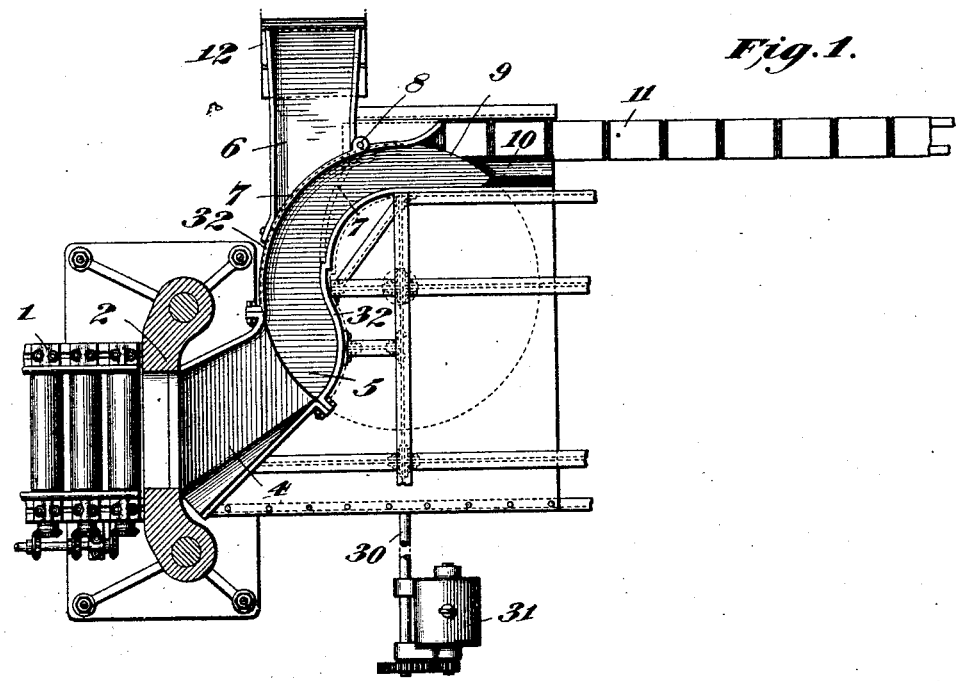
Figure 1 is a top plan view of my improved mill appliance.
Figure 2:
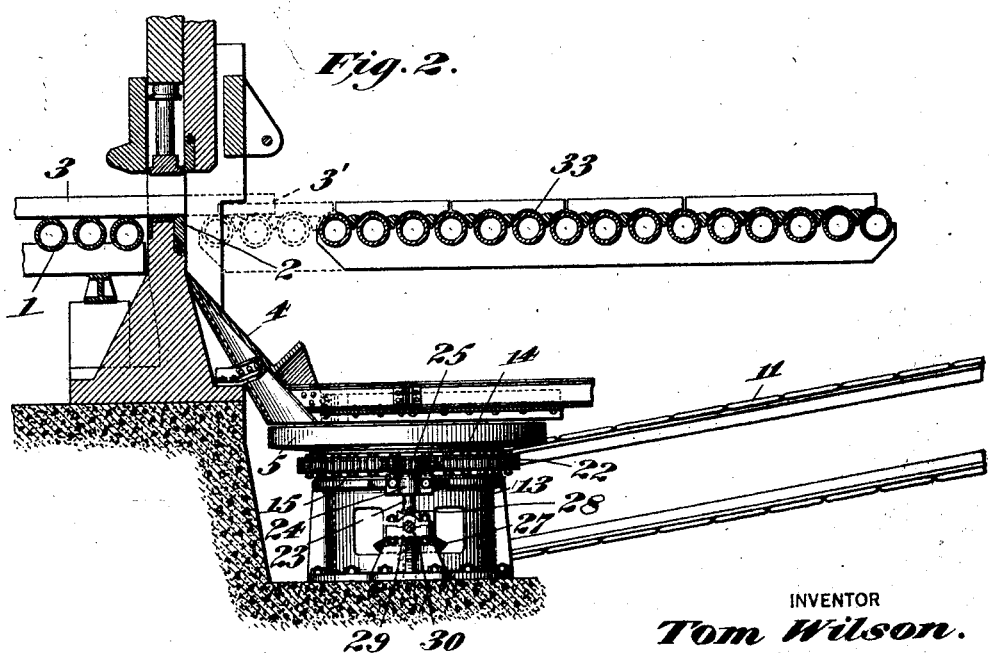
Figure 2 is a side elevation of the same.

Referring now to the numbers of reference on the drawings 1, is a roller feed table adapted to deliver long billets from the rolling mill to shears 2 which long billets first have their forward or crop ends cut off and then are cut into pieces of lengths ordered or necessary for further rolling in a finishing mill. The forward ends of the long billets 3 are delivered to the shears 2, and cut into billets 3'. At the rear of the shear 2, is the downwardly inclined chute 4 adapted to receive the cut pieces and deliver them to the upper solid surface 5 of the turntable which as viewed in plan of Figure 1 rotates in a clock-wise direction. 6 is an inclined trough or scrap chute adapted to receive the forward and rear crop ends of the billets and any other pieces which may be cut from the long billet, having imperfections therein and the discharge to said chute is controlled by means of the pivotal gate 7, pivoted at 8.

When the gate 7 is open as shown by the dotted lines in Figure 1 the crop ends and imperfect billets are discharged from the turntable and are delivered to the chute 6, thence to the conveyor 12, only a short part of which is illustrated, and thence to a scrap car or otherwise for remelting or other disposition. When the gate 7 is closed as shown in full lines in Figure 1 the good billets of predetermined lengths as cut by the shear are delivered by the rotation of the turntable through the opening 9 and slide laterally down the inclined slideway 10 to the billet conveyor 11 which may be a chain conveyor, preferably upwardly inclined and having flat plates of metal arranged on its upper surface and adapted to be operated as usual in such constructions. The further end of this conveyor 11 (not shown) may be at a storage yard where the billets are dumped onto piles by means of a scraper on the conveyor or otherwise or they may be delivered from said conveyor to cars on which they are transported to the finishing mills, or elsewhere.

The turntable is provided with a base casting 13 and on the lower surface of the turntable 5 is the upper track 14 for the rollers, while the base casting is provided with a main gear wheel 16 which is mounted on the shaft or king pin 18 adapted to rotate in the central bushing 17. A spider is provided within the main gear wheel which carries the axles 20 secured thereto on which are mounted the tapered rollers 19 between the race ways 14 and 15 as illustrated, the axles being secured in place by the keys 21. The main gear wheel has a toothed edge 22, the gear teeth of which mesh with those of the pinion 25, which pinion is mounted and secured on a vertical jack shaft 23, adapted to be rotated in its upper bearing 24 and its lower bearing 26. This jack shaft 23 is driven by the bevel gear 27 mounted thereon which meshes with the bevel pinion 28 mounted on the drive shaft 30, which rotates in the bearing 29. The shaft 30 is driven by the motor 31 as illustrated particularly in Figure 1. On top of the turntable are guards or guides 32 mounted above, but adjacent to the upper surface of the turntable 5 as illustrated in order to divert and guide the pieces as they are moved thereon by the rotation of the table as heretofore described.

I may also provide a roller table 33 which is adapted to convey longer billets from the shear to a car or otherwise for further disposition. This roller table 33 is however in the position as shown by the full lines when my turntable is in operation, but it may be moved forward to a position shown by the dotted lines when long billets are to be handled and when my turntable and auxiliaries are not in operation. The gap between the roller table and the shear when my feed table 5 is in operation is sufficient to allow the passage of any billets to my apparatus.

Although I have shown and described my invention in considerable detail, I do not wish to be limited to the exact and specific details thereof as shown and described, but may use such modifications in, substitutions for, or equivalents thereof, as are embraced within the scope of my invention or as pointed out in claims.

Having thus described my invention, what I claim and desire to secure by Letters Patent is:

1. A mill appliance comprising the combination with a conveyor, of a scrap chute, and a rotatable turn-table, means for delivering heavy and hard billets to the upper surface of the turn-table, said turntable having a guide near the periphery thereof, another guide within and spaced apart from same, and a switch gate adapted to form an opening in the outer guide as desired, whereby material may be delivered in either of two directions by said turntable.

2. A mill appliance comprising the combination of an upwardly inclined conveyor, a rotatable turn-table, and a scrap chute, means for delivering billets to the upper surface of said turn-table, a pair of guides adjacent to the upper surface of said turntable, a switch gate forming part of the outer guide and adapted to be swung to open or close an opening whereby the material may be diverted and delivered to said conveyor or chute in either of two directions.

3. A mill appliance comprising a heavy and massive rotatable turn-table, a flight conveyor operatively connecting therewith, a scrap chute adapted to operatively connect with said turn-table, gravity means adapted to deliver billets to the upper surface of said turn-table, a guide near the periphery of and another guide within and spaced apart therefrom, and a switch gate adapted to form an opening in the outer guide and divert the billets to the scrap chute when open or to the conveyor when closed.

4. The combination with a billet shear of a mill appliance, comprising a conveyor, a rotatable turntable of solid construction and a scrap chute, means for conveying billets by gravity from said shear to said turntable, an inner and outer guide adjacent the top of said turntable, a switch gate forming part of the outer guide and adapted to be opened or closed whereby the billets and crops may be delivered to the scrap chute or conveyor as desired.

5. The combination with a shear of a rotatable turntable, the top of which is below the shear knife, gravity means for delivering billets to said turntable, means for guiding said billets on said turntable, inner and outer guides adjacent to and above said turntable, and a switch gate forming part of said outer guide, whereby certain pieces may be diverted and delivered to the scrap chute and other pieces diverted and delivered to the conveyor.

6. A mill appliance comprising the combination with a billet shear of a rotatable turntable having outer and inner guides, a switch gate forming part of the outer guide and adapted to be opened or closed, an inclined scrap chute having its upper end adjacent said gate, a conveyor having its end adjacent the terminal of the space between said guides, whereby when the gate is closed billets are delivered to the conveyor and when open, billets or crops are delivered to the scrap chute.

7. In a mill appliance, a rotatable turntable provided with a guide near the periphery thereof, another guide within and spaced apart from same, and a switch gate adapted to form an opening in the outer guide as desired, whereby material may be delivered in either of two directions by said rotating turntable.

8. A mill appliance comprising a rotatable turntable provided with a pair of guides adjacent to its upper surface and a switch gate forming part of the outer guide and adapted to be swung to open or close an opening whereby the material may be diverted and delivered in either of two directions.

9. A mill appliance comprising a rotatable turntable provided with a pair of guides spaced apart and adjacent to its upper surface, a switch gate adapted to open or close an opening in the outer guide, a conveyor adjacent to the terminal opening between said guides, whereby material may be delivered by said turntable in either of two locations as desired.

In witness whereof I hereunto affix my signature.

TOM WILSON.